United States Patent
Cariccia et al.

(10) Patent No.: US 12,297,897 B2
(45) Date of Patent: May 13, 2025

(54) FILTERING PULLEY

(71) Applicant: DAYCO EUROPE S.R.L., Chieti (IT)

(72) Inventors: Gianluca Cariccia, San Bernardo d'Ivrea (IT); Miriam Nardone, San Bernardo d'Ivrea (IT); Andrea Guala, San Bernardo d'Ivrea (IT); Gilberto Delle Rose, San Bernardo d'Ivrea (IT); Federico Licata, San Bernardo d'Ivrea (IT)

(73) Assignee: MUVIQ S.R.L., Ivrea (IT)

( * ) Notice: Subject to any disclaimer, the term of this patent is extended or adjusted under 35 U.S.C. 154(b) by 0 days.

(21) Appl. No.: 18/253,492

(22) PCT Filed: Dec. 10, 2021

(86) PCT No.: PCT/IB2021/061565
§ 371 (c)(1),
(2) Date: May 18, 2023

(87) PCT Pub. No.: WO2022/123514
PCT Pub. Date: Jun. 16, 2022

(65) Prior Publication Data
US 2024/0011550 A1 Jan. 11, 2024

(30) Foreign Application Priority Data
Dec. 10, 2020 (IT) .................. 102020000030395

(51) Int. Cl.
*F16H 55/36* (2006.01)
*F02B 67/06* (2006.01)

(52) U.S. Cl.
CPC ............. *F16H 55/36* (2013.01); *F02B 67/06* (2013.01); *F16H 2055/366* (2013.01)

(58) Field of Classification Search
CPC ....... F16H 2007/0802; F16H 2055/366; F16H 55/36; F16D 7/022; F16D 3/12; F16D 43/211; F02B 67/06
(Continued)

(56) References Cited

U.S. PATENT DOCUMENTS 9,182,029 B2 * 11/2015 Fenayon ................. F16D 41/06
9,518,646 B2 * 12/2016 Marion .................. B60K 26/02
(Continued)

FOREIGN PATENT DOCUMENTS

| JP | 2016070486 A | 5/2016 |
|---|---|---|
| WO | 2006/081657 A1 | 8/2006 |
| WO | 2015/198277 A1 | 12/2015 |

OTHER PUBLICATIONS

PCT/IB2021/061565, International Search Report and Written Opinion, Feb. 8, 2022 (14 pages).

*Primary Examiner* — Henry Y Liu
*Assistant Examiner* — Katelynne R Burrell
(74) *Attorney, Agent, or Firm* — FisherBroyles, LLP; Susan M. Oiler (57) ABSTRACT

A filtering pulley for an accessory transmission of an internal combustion engine that has a hub, a crown, a filtering unit for transmitting the torque interposed between the hub and the crown, a torsion spring, a carrier, and a torque limiting joint. The torque limiting joint has an open-loop strip spring and is configured to slide with respect to said surface when the torque transmitted between the crown and the hub reaches a predetermined level.

13 Claims, 7 Drawing Sheets

(58) Field of Classification Search
USPC .............................................. 474/94, 70, 74
See application file for complete search history.

(56) References Cited

U.S. PATENT DOCUMENTS

| | | | |
|---|---|---|---|
| 9,759,274 B2* | 9/2017 | Ward | F16D 7/024 |
| 12,005,779 B2* | 6/2024 | Bahri | F02B 67/06 |
| 12,173,780 B2* | 12/2024 | Cariccia | F16H 55/36 |
| 2004/0014540 A1* | 1/2004 | Dell | F16H 55/36 |
| | | | 474/69 |
| 2004/0112700 A1* | 6/2004 | Liston | F16H 55/36 |
| | | | 192/41 S |
| 2014/0027235 A1* | 1/2014 | Fenayon | F16H 55/36 |
| | | | 192/45.004 |
| 2016/0010742 A1* | 1/2016 | Chang | F16H 55/36 |
| | | | 474/166 |
| 2024/0410459 A1* | 12/2024 | Cariccia | F16F 15/1297 |

\* cited by examiner

FILTERING PULLEY

CROSS-REFERENCE TO RELATED APPLICATIONS

The present invention is filed under 35 U.S.C. § 371 as the U.S. National Phase of International Patent Application No. PCT/IB2021/061565, filed Dec. 10, 2021, which designated the United States and which claims the benefit of Italian patent application no. 102020000030395, filed on Dec. 10, 2020, the entire disclosure of which is incorporated herein by reference.

TECHNICAL SECTOR

This invention relates to a filtering pulley, in particular for a belt transmission of an internal combustion engine of a motor vehicle.

The preferred application of this invention, though not the exclusive one, is in the drive pulley of an alternator of an internal combustion engine. Reference will be made to this application below by way of example, it being, nonetheless, clear that the invention's pulley may be used as a driving pulley connected to the engine shaft or as a driven pulley for pulling any other accessory of the engine itself, for example a reversible electric motor serving as a generator and a motor.

PRIOR ART

In motor vehicles the use of a filtering pulley is known for pulling the alternator using the accessory transmission belt.

This pulley comprises a hub designed to be connected to the rotor of the alternator, an annular crown provided with a profile designed to cooperate with the belt, and a filtering unit interposed between the hub and the crown of the pulley in order to avoid subjecting the belt to dynamic overloads when there are torsion vibrations of the engine shaft or quick changes in speed of the engine itself.

The filtering unit generally comprises a spring, for example a coil or spiral spring, or multiple springs or other elastic elements arranged circumferentially between the hub and the crown.

Since the alternator has a relatively high equivalent inertia and tends to pull the pulley when there are instantaneous speed reductions of the engine shaft, it is known to incorporate, in the filtering unit, a free wheel designed to transmit, in one direction, the motion of the crown to the hub (normal operating condition) but to decouple the hub from the crown when the torque is reversed.

The introduction of start-stop systems in which a reversible electric motor having the function of a drive motor or alternator, depending on the operating conditions, is used makes it impossible to use a filtering pulley with a free wheel since this would decouple the electric motor, when it is driving, from the belt transmission.

To resolve this problem, solutions have been proposed in which the filtering unit comprises a spring attached at its ends to respective elements respectively coupled to the hub and to the pulley with a predetermined width relative freedom of rotation.

An example of a known solution to this problem is illustrated in WO 2015/198277 A1. In any case, this solution is not optimised enough to ensure the desired technical performance. Moreover, this solution is radially and axially bulky.

There is, therefore, a need to provide a filtering pulley that can be used both in a start-stop system and in a conventional transmission system, which resolves the problems of the known filtering pulleys described above.

Another purpose of this invention is to produce a filtering pulley, which is both compact and inexpensive to manufacture.

SUMMARY OF THE INVENTION

The above-mentioned purpose is achieved with a pulley as claimed in the attached independent claims.

Additional, preferred embodiments of the invention are constructed according to the dependent claims or those connected to the independent claims mentioned above.

BRIEF DESCRIPTION OF THE DRAWINGS

To better understand this invention a preferred embodiment is described below, by way of non-limiting example and with reference to the attached drawings, in which.

DETAILED DESCRIPTION OF THE INVENTION

Figure 1:
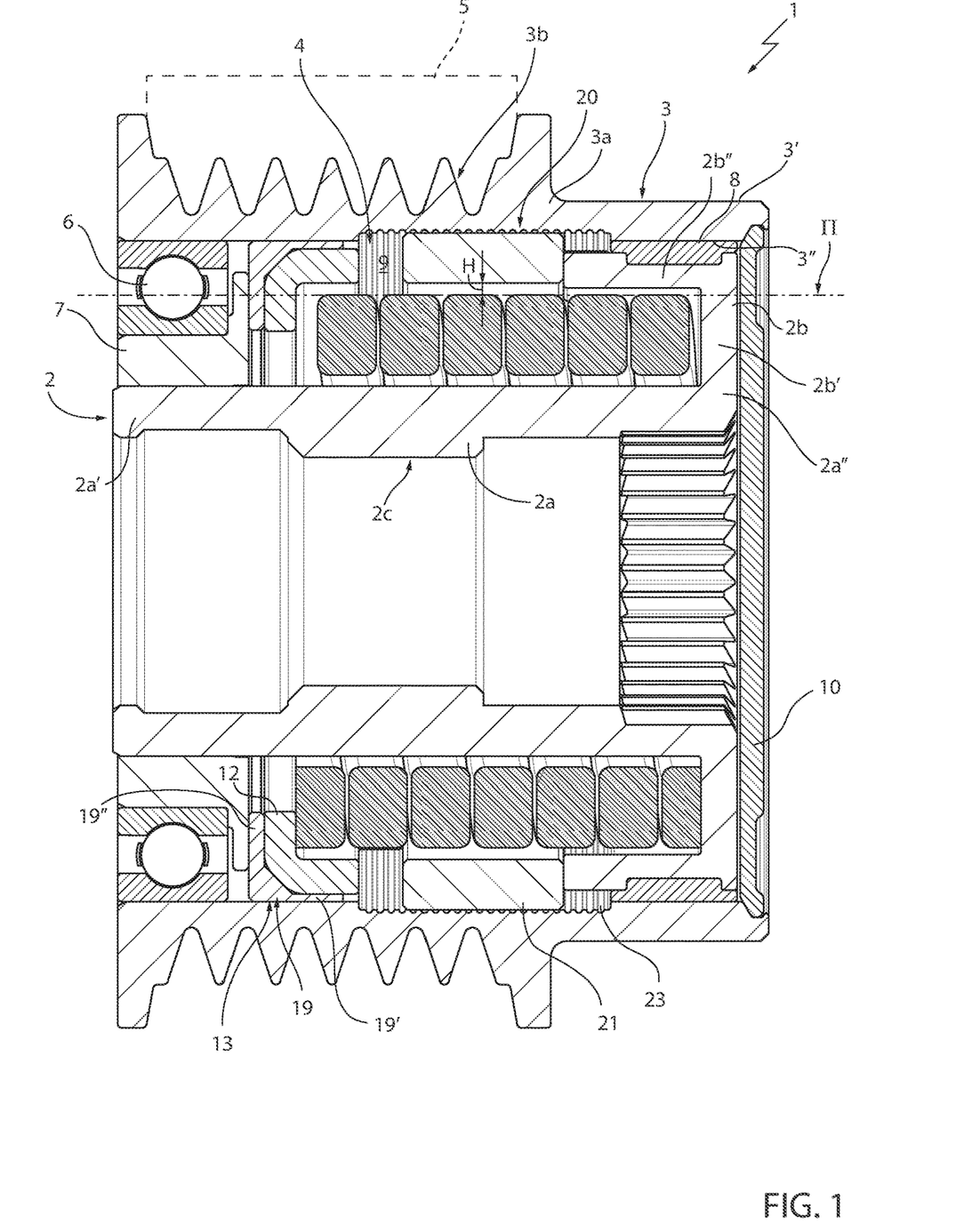
FIG. 1 is a longitudinal cross-section view of a pulley according to the invention.
Figure 2:
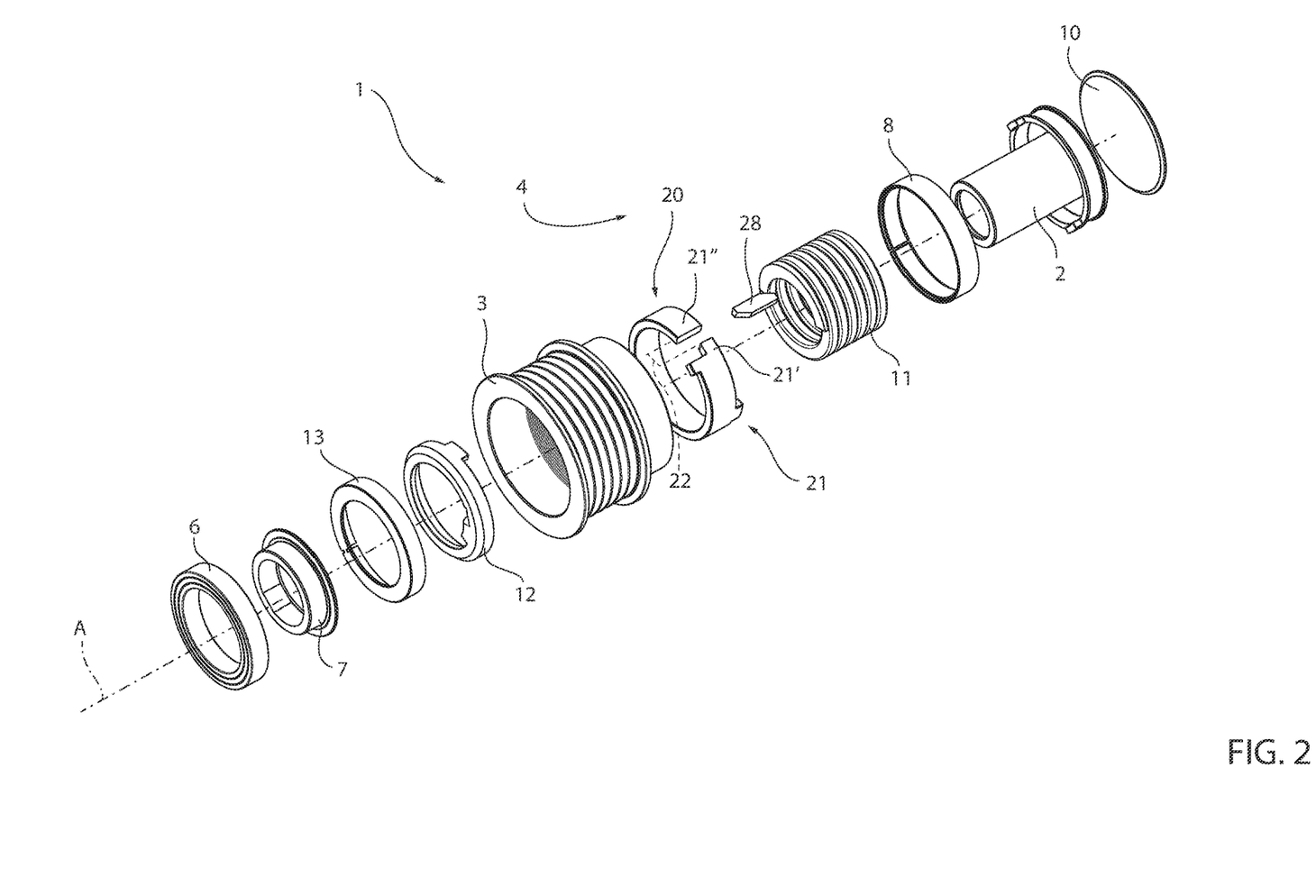
FIG. 2 is an exploded perspective view of the pulley in FIG. 1.
Figure 3:
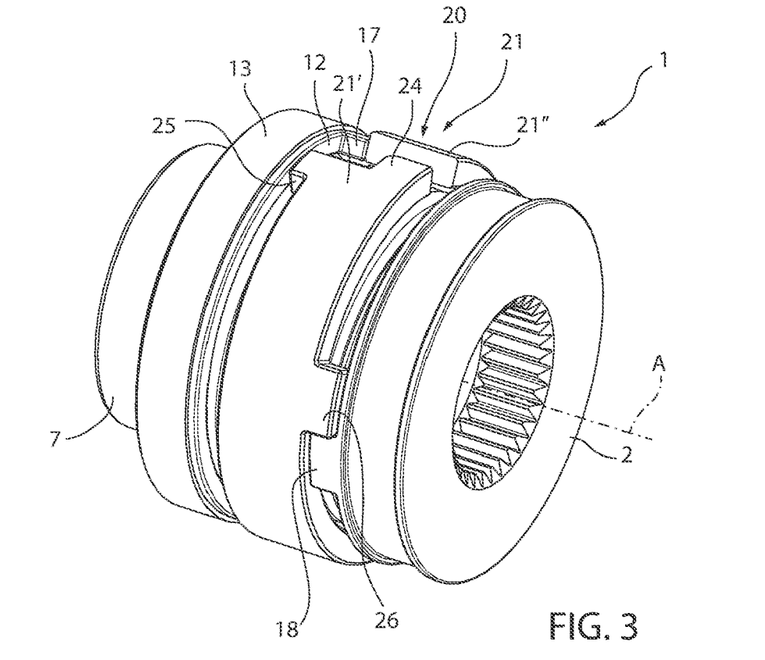
FIGS. 3 and 4 are perspective views, respectively from different angles, of the pulley in FIG. 1 with parts removed for clarity.
Figure 4:
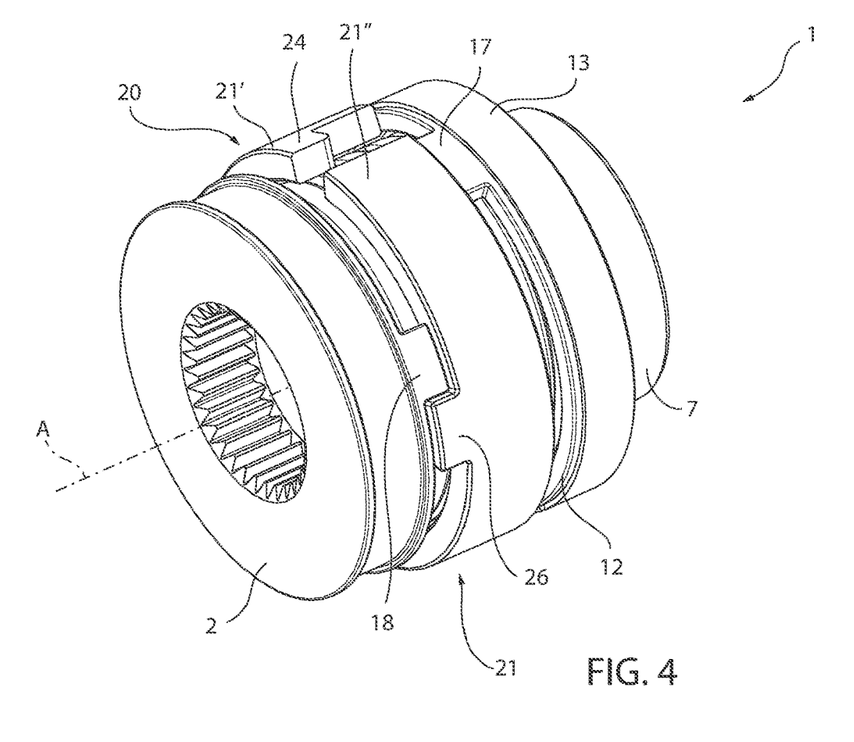

With reference to FIGS. 1 and 2, a pulley 1 is illustrated that basically comprises a tubular hub 2, a tubular crown 3 externally coaxial to the hub 2 and supported so that it is rotationally free on the latter, and a filtering unit 4 for transmitting torque, operationally interposed between the hub 2 and the crown 3. The hub 2 and the crown 3 are coaxial around a longitudinal axis A.

The hub 2 is designed to be rigidly fixed to a shaft, not illustrated, of an accessory component of an internal combustion engine, for example an alternator or a reversible electric motor serving as an alternator and a drive motor in a start-stop system.

In particular, the hub 2 comprises a tubular cylindrical portion 2a defining a coupling portion 2c therein with the above-mentioned shaft between a first end 2a' and a second end 2a'' of the cylindrical portion 2a. The hub 2 comprises, in addition, a flanged portion 2b extending radially from one 2a'' of the end portions towards the crown 3 and provided with a radial portion 2b', extending perpendicularly to the axis A, and a longitudinal portion 2b'', extending so that it overhangs the radial portion 2b' parallel to the axis A towards the other end 2a' of the hub 2.

The crown 3 basically comprises an annular portion 3a, which has a multiple-groove profile 3b designed to cooperate with a poly-V belt 5 (of which a cross-section is schematically represented in FIG. 1). The profile 3b is obtained on an outer surface 3' of the crown 3 opposite to an inner surface 3" cooperating with the filtering unit 4.

The crown 3 is supported on the hub 2 using rolling/sliding support means. In particular, the pulley 1 comprises a rolling bearing 6, for example a ball bearing, radially interposed between the crown 3 and the first end 2a' of the hub 2. In particular, the rolling bearing 6 is supported on the hub 2 via a head element 7 attached to the first end 2a', due to pulley 1 assembly needs.

On the other hand, the pulley 1 comprises a sliding bearing 8, for example a ring made of low friction material, radially interposed between the crown 3 and the second end 2a" of the hub 2, i.e., between the longitudinal portion 2b" and the inner surface 3" of the crown 3.

Between the crown 3 and the hub 2 there is, thus, a space 9, radially delimited between the inner surface 3" of the crown 3 and by the outer surface of the cylindrical portion 2a of the hub 2 and axially delimited between the rolling/sliding support means described above.

The pulley 1 may, in addition, comprise a lid 10 configured to axially delimit one of the ends of the pulley 1 and, advantageously, configured to be housed within the crown 3, i.e., radially cooperating in contact with the latter.

The filtering unit 4 is housed in the space 9 and basically comprises a torsion spring 11, a spring holder element 12, called a carrier below, cooperating with one end of the spring 11, and a damping ring 13 axially interposed between the carrier and the head element 7.

Figure 5:
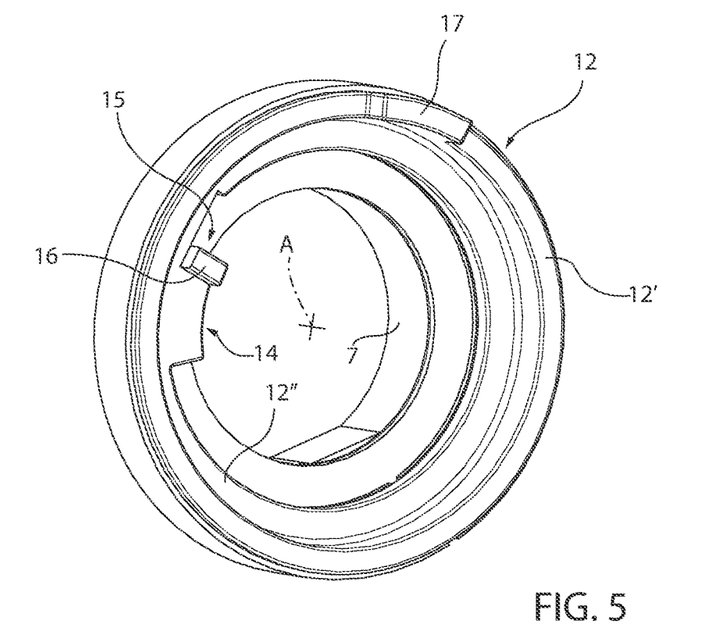
FIGS. 5 and 6 are perspective views of respective elements being part of the pulley according to the invention.
Figure 6:
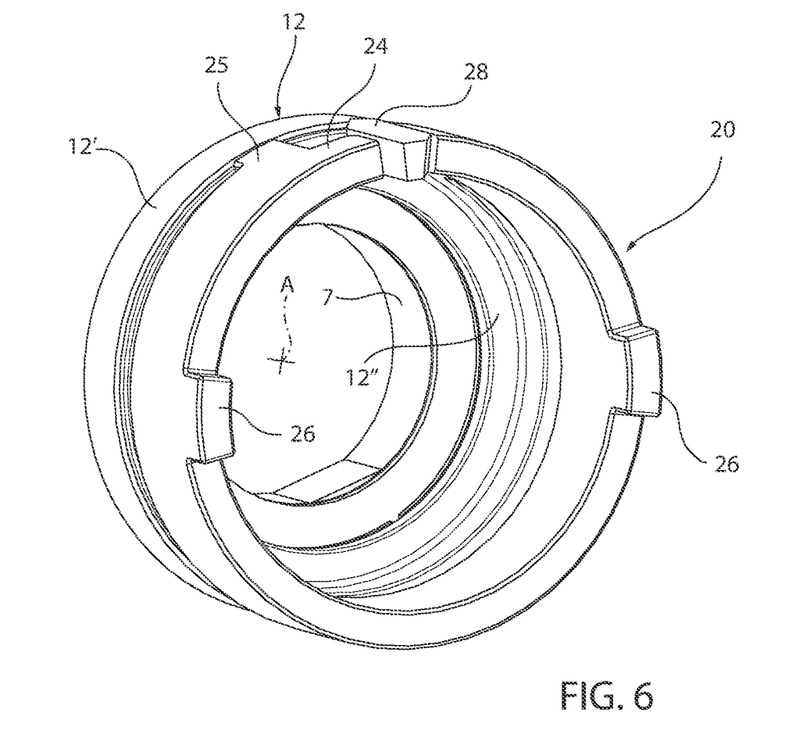
Figure 7:
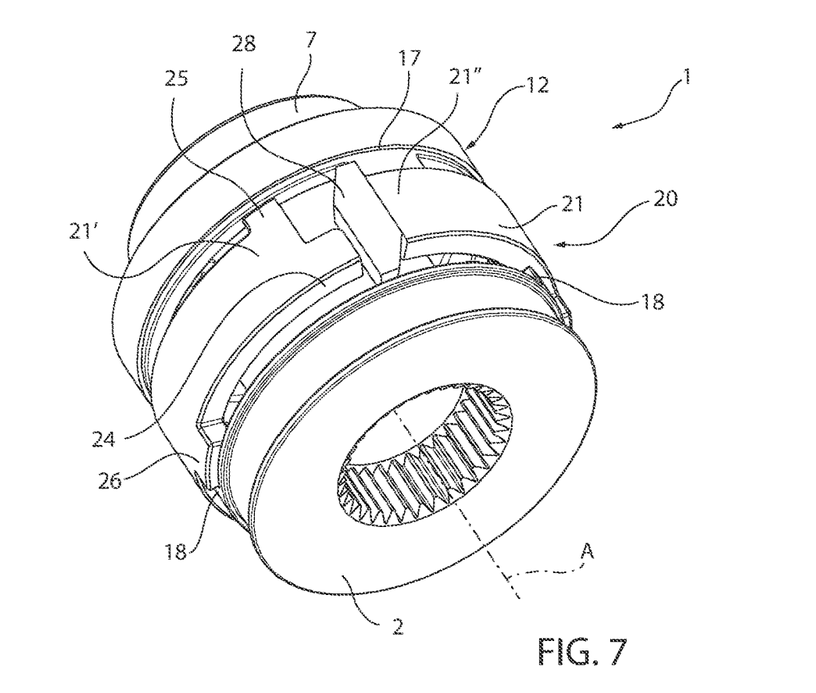
FIGS. 7 and 8 are perspective views, respectively in two different operating conditions, of the pulley in FIG. 1 with parts removed for clarity.
Figure 8:
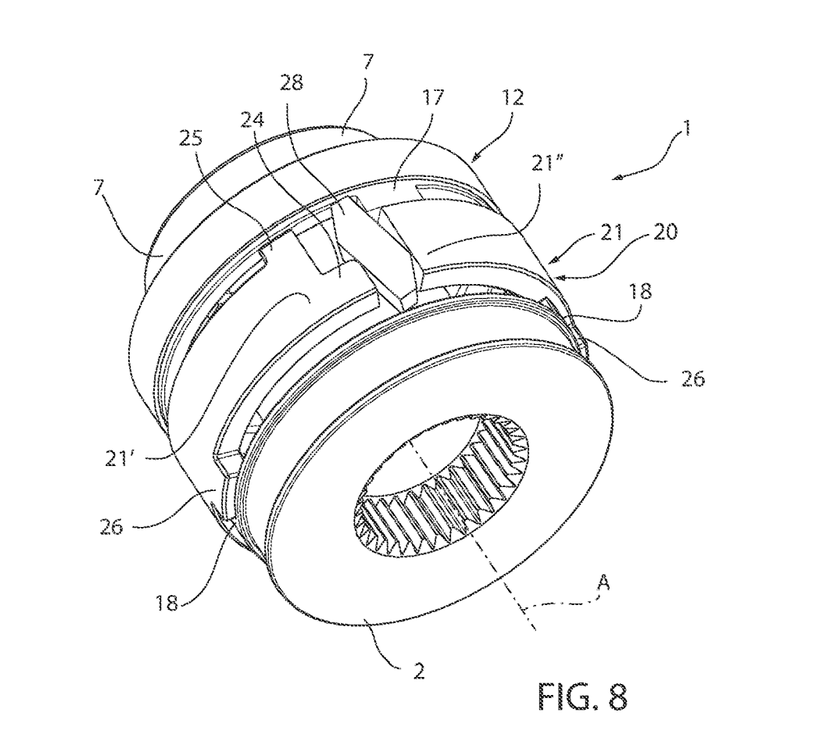
Figure 9:
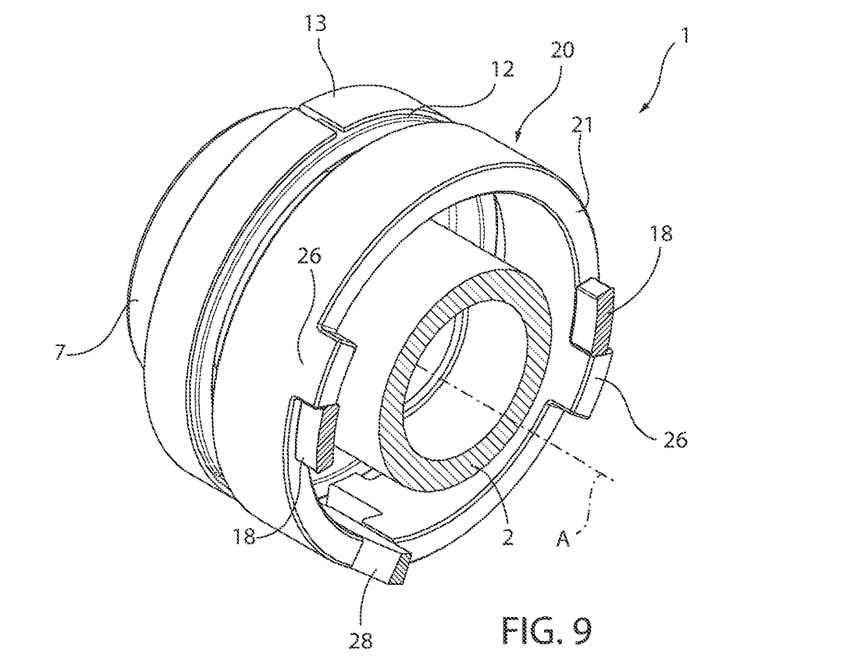
FIGS. 9 and 10 are additional perspective views, respectively in two different operating conditions, of the pulley in FIG. 1 with parts removed for clarity.
Figure 10:
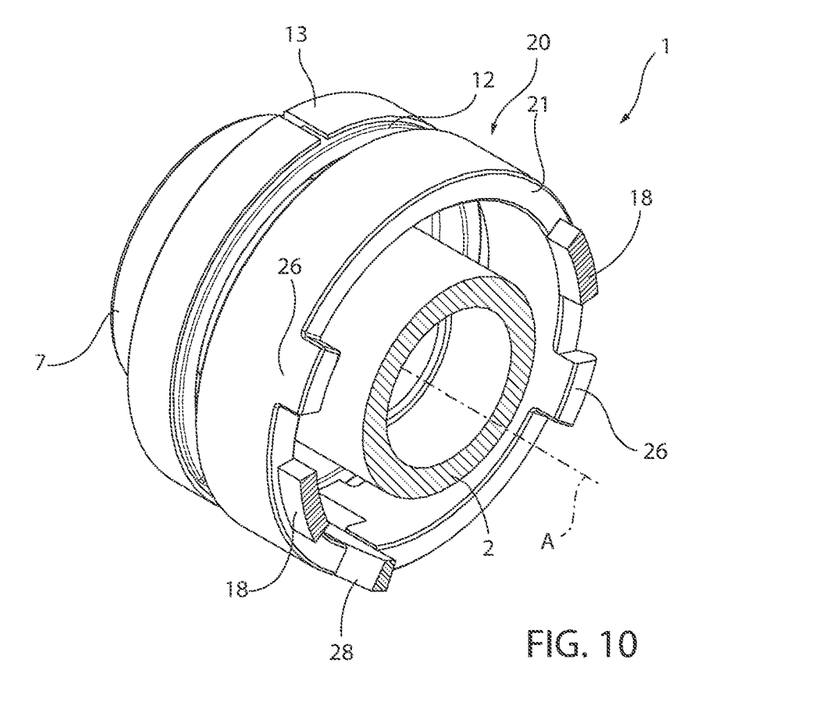

The carrier 12 cooperates in contact by sliding, i.e., it axially slides in contact, with the head element 7. Referring to FIGS. 1 and 5, the carrier 12 is ring-shaped and defines an annular wall 12' coaxial to the axis A and a radial wall 12" extending radially towards the axis A beginning from an axial edge of the annular portion 12'.

This radial wall 12" is configured to cooperate by sliding with the head 7 on a first side, while on a second side opposite the previous one, it defines an inner radial protrusion 14 configured to house a spring-stop element 15. In particular, the spring-stop element 15 comprises an axial projection 16 extending axially along the axis A from the inner radial protrusion 14 and configured to cooperate in contact with one end of the spring 11.

The annular wall 12' also defines an axial projection 17 extending axially along the axis A from the axial edge of the annular portion 12' opposite the radial wall 12", the function of which will be described below.

As can be seen in FIGS. 3-4 and 9-10, the longitudinal portion 2b" of the hub 2 defines a pair of projections 18 extending axially along the axis A, in relation to the longitudinal portion 2b", towards the carrier 11. Clearly, these projections may have any angular distance, circumferentially, between them. In particular, these projections are arranged at 180° from each other.

The spring 11 is, preferably, a coil spring with wire of a rectangular cross-section and comprising multiple coils wrapping around the axis A between the carrier 12 and the flanged portion 2b of the hub 2. As mentioned above, an end portion of the spring 11 cooperates in contact with the spring holder 15 while the opposite end cooperates in contact with a respective spring holder, not visible, made in the flanged portion 2b. As a result, the flanged portion 2b is configured to externally wrap, in part, the spring 11.

The damper 13 basically comprises the annular element 19 made of polymer that has an "L"-shaped cross section and, thus, is provided with a longitudinal portion 19' radially interposed between the carrier 12 and the inner surface 3" of the crown 3 and an axial portion 19" axially interposed between the carrier 12 and the head 7. The annular element 19 is coupled, by friction or by coupling with the shape, to the carrier 12 and, thus, is not integral around the axis A.

The pulley 1 also comprises a torque-limiting joint 20 basically comprising a strip spring 21 (FIGS. 3 to 10) housed in the space 9 and configured to fulfil, at the same time, the function of free wheel in both relative rotation directions between crown 3 and hub 2. Advantageously, this free wheel effect is provided at different levels of torque that can be transmitted between hub 2 and crown 3 in one direction compared to another.

In particular, the torque-limiting joint 20 is sized in order to cooperate in contact with the hub 2 and the carrier 12 in order to decouple the crown 3. In particular, the limiting joint 21 is housed in the space 9 in contact with the inner surface 3" of the crown 3.

In more detail, the strip spring 21 has a basically open-ring shape with two ends 21', 21" delimiting a space 22 between them. The strip spring 21 is mounted with radial interference inside the inner radial surface 3" of the crown 3, in particular in a machined area 23. In particular, the area 23 is machined in order to define a grooved/wavy surface, of the paracentric type, with dimensions designed to enable a predetermined friction between the strip spring 21 and crown 3.

The strip spring 21 has a basically constant axial dimension across the entire circumferential extension and preferably has a rectangular cross-section.

In any case, one 21' of the two end portions 21" defines at least one projection 24, 25. In particular, a first projection 24 extends in a circumferential direction beginning from the end portion 21' towards the end portion 21" opposite the inside of the space 22, and a second projection 25 extends axially along the axis A from one axial edge of the strip spring 21 towards the carrier 12. The second projection 25 is axially sized in order to cooperate in contact in the circumferential direction with the projection 17 defined by the carrier 12.

In addition, on the axial edge opposite the one defining the projection 25, the strip spring 21 defines two additional projections 26 configured to cooperate in contact circumferentially with the projections 18 of the hub 2, arranged as described above.

The inner radial surface of the strip spring 21 is spaced apart by a predetermined distance H from the outer surface of the spring 11, i.e., in relation to a plane n tangential to the peak of the curve of the spring 11 coils. Alternatively, or in combination to the operation described below, the value of the distance H may be predetermined as a function of the maximum torque to transmit through the spring 11 as an additional safety function.

As an alternative to the presence of the projection 25, or in combination with it, the torque-limiting joint 20 also comprises an actuator element housed in the space 22 and configured to cooperate in contact with the projections 17, 18 to increase or decrease the opening of the strip spring 21 when the actuator element acts on them.

Advantageously, the actuator element comprises a (metallic) lever 28 housed in the space 22 and circumferentially interposed between the end portions 21', 21" of the strip spring 21 and configured to cooperate in contact with the projection 24 and the end portion 21", circumferentially, and extending in the axial direction in order to cooperate in contact, circumferentially, with the projections 17 of the carrier 12 and 18 of the hub 2. In this embodiment, the projection 25 thus does not cooperate in contact with the projection 17 and may not be present on the strip spring 21.

According to one alternative embodiment, not illustrated, the strip spring 21 may comprise an additional axial projection on the opposite side of the projections 26 and configured to cooperate with a respective projection borne by the carrier 12. These projections are angularly arranged between them so as to cooperate circumferentially in contact simultaneously to the contact of the lever 28 with the respective projections.

The operation of the embodiment of the pulley 1 according to the invention described above is the following, referring to the embodiment comprising the lever 28.

In normal conditions, i.e., when the crown 3 pulled by the belt 4 drives the hub 2 and, thus, tends to overrun it ("drive mode"), the spring 21 rotates integrally with the crown 3 and the hub 2 is resistant.

Supposing a starting condition wherein the projections 18 of the hub are in contact with the projections 26, the strip spring 21 will tend to move clockwise in relation to the axis A driven by the crown 3. Beginning from this condition, the lever 28 is arranged tilted as it is pushed tangentially between the portions 21', 21" by the projection 24 of the spring 21 and increases the opening thereof, increasing the adherence between the latter and the inner surface of the crown 3. Axially, the lever 28 acts on the tooth 17 of the carrier 12, which starts to be driven by the spring 21 and to slide on the head element 7. In this way, the spring 11 is charged with torsion and transmits torque to the hub 2, being attached to the opposite flanged portion 2b. If the torque transmitted by the crown 3 continues to increase, this is moved again around the axis A until one opposite end of the lever 28, in relation to that in contact with the projection 17, engages with the projections 18 of the hub 2. In this condition, the lever 28 is returned to a straight condition and the strip spring 21 closes itself again, returning to the assembly interference value. In this way, it slides in relation to the inner surface 3" of the crown 3, lacking the necessary adherence and, thus, decoupling the crown 3 and the hub 2.

When, instead, the hub 2 tends to overrun the crown 3 ("overrunning"), the spring 21 rotates integrally with the crown 3 and it is resistant to the hub 2.

Supposing the decoupling condition described earlier, the crown 3 will tend to rotate anticlockwise in relation to the hub 2 decoupling the lever 28 from the projection 18. In this condition, the spring 11 will tend to discharge and the strip spring 21, borne by the crown 3, will continue to rotate anticlockwise until the projections 25 cooperate with the other projections 18 of the hub 2. In this way, the crown 3 will tend to slide in relation to the strip spring 21, which will be fixed to the hub.

If there is no lever 28, the operation is similar and in the driving torque condition the coupling occurs between the projections 17 and 25 until the torque increases to a level so that the action between the projections 17 and 25 tends to close the spring 21 on itself, decoupling the crown 3 and hub 2.

If there is no lever 28 and there are no projections 18, the torque limiting function can be fulfilled by the predetermined distance H between the strip spring 21 and torsion spring 11.

If there is an additional projection on the side opposite the projections 26, this helps to limit the expansion of the strip spring 21, ensuring the sliding between the pulley 3 and strip spring 21.

Figure 11:
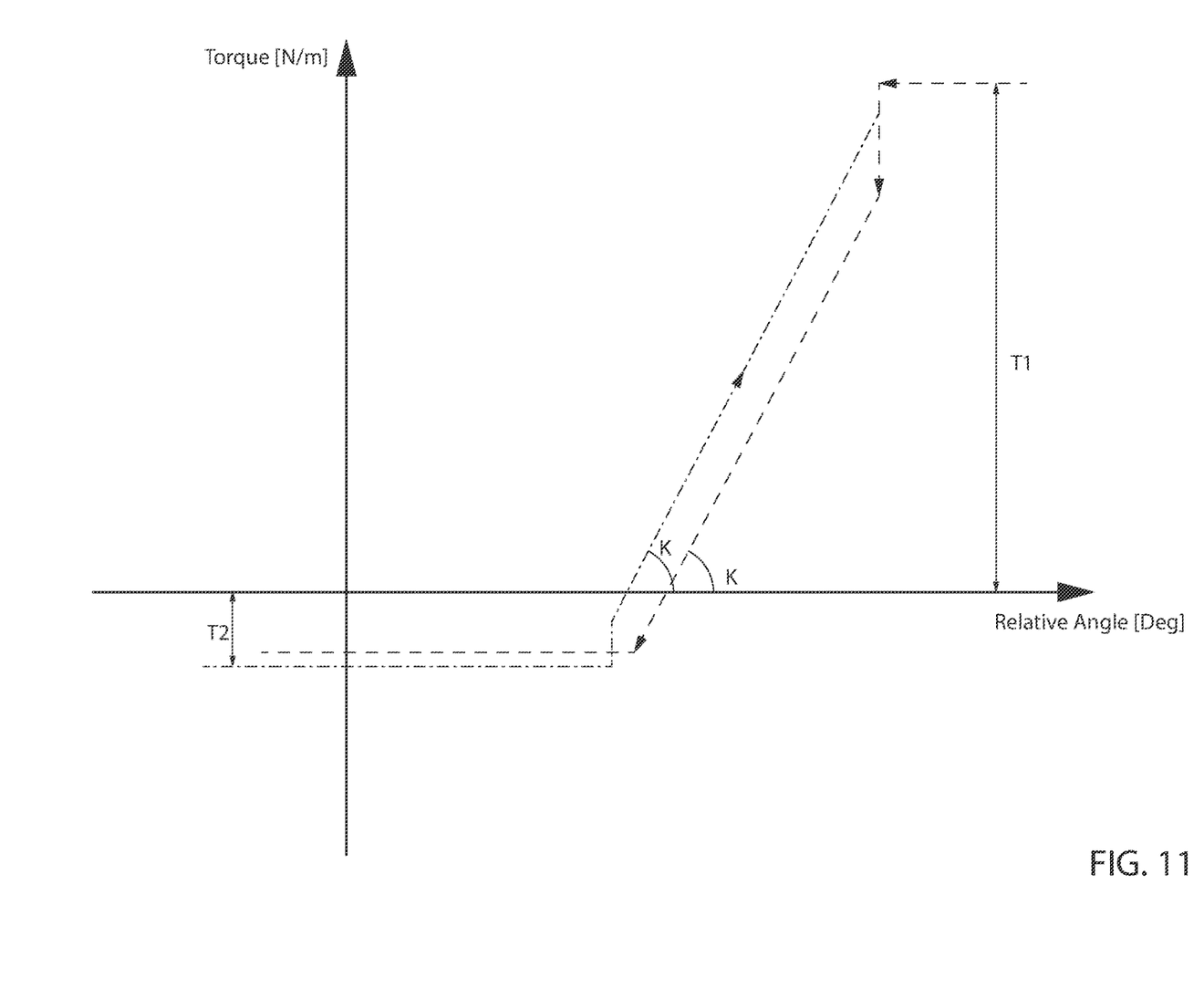
FIG. 11 is a graph that represents the torque transmitted as a function of the relative rotation angle between two elements of the pulley according to the invention.

FIG. 11 shows a graph of the torque transmitted as a function of the relative rotation angle between the crown 3 and hub 2.

In the "drive mode", it is clear that the feature increases linearly, according to an inclination K owing to the stiffness of the torsion spring 11, until the maximum torque value T1, defined above, passing by one step representing the direct coupling between crown 3 and hub 2. In the opposite direction, it still has a linear characteristic but with a decoupling at a torque value T2 that is less than in the previous example.

Clearly, before the coupling K, there is an angular play equal to the free sliding distance between the projections 26 and 18. It is possible to envisage alternative embodiments wherein, in place of the projections 26, there is a circumferential edge defining a seat enabling an extremely reduced angular gap of the projections 18 within this seat.

By varying the angular width of this circumferential edge/projections 26 it is, thus, possible to vary the free angular gap between the pulley 3 and hub 2 according to what is needed for the filtering features of the pulley 1.

From the above, the advantages of a pulley 1 according to the invention are clear.

In relation to the known solutions involving the use of a free wheel, this invention equipped with a torque-limiting joint 20 makes it possible to obtain bi-directional coupling between hub and pulley, at least within a predetermined range of torques, making it possible to use the pulley in start-stop systems.

In relation to the solutions described, the angular limitation function is directly performed by the appropriately sized torque-limiting joint 20.

In particular, its distance H in relation to the torsion spring 11 limits the maximum torque transmission thereof.

In particular, the use of a pair of teeth 18 and of an actuator element makes it possible to obtain a safer maximum torque limitation and to simply decouple, and with elevated torque, the crown 3 from the hub 2.

In general, the filtering pulley illustrated here has small radial and axial dimensions and has a limited number of elements. Thus, it is inexpensive to manufacture and its assembly is easier.

Finally, it is clear that changes may be made to the pulley 1, and variations produced thereto, according to this invention that, in any case, do not depart from the scope of protection defined by the claims.

In particular, the spring 21 could be coupled to the hub 2 instead of the crown 3.

The lever 28, as mentioned, may be omitted if the adherence between the spring 21 and the surface 3" of the crown 3 (or of the hub 2) in the "drive mode" is enough to transmit the torque required. Similarly, the projections 18 may be omitted if the torque limitation provided by the radial limitation of the distance H (provided between the strip spring 21 and torsion spring 11) is enough.

The pulley may be used as a drive pulley on the engine shaft instead of on the alternator and may also be used on a conventional alternator or on any other accessory.

The invention claimed is:

1. A filtering pulley for an accessory transmission of an internal combustion engine, comprising;
   a hub defining a longitudinal axis (A) and having an outer axially extending annular flange that has a pair of projections extending axially therefrom that are spaced an angular distance apart from one another,
   an annular crown provided with a profile configured to cooperate with a transmission belt, externally coaxial around the longitudinal axis (A) and supported in free rotational motion on the hub itself, and a filtering unit for transmitting the torque interposed between said hub and said crown and comprising a torsion spring, a carrier and a torque limiting joint, said carrier cooperating by sliding with respect to a portion integral with said hub, said carrier defining a spring holder and a first projection extending along said axis (A) and configured to selectively cooperate through contact with said torque limiting joint, said torsion spring being operatively interposed between said carrier and said hub and being provided with two ends cooperating in contact with the spring holder of said carrier and said hub, respectively, said torque limiting joint is mounted in radial interference in contact with an internal surface of said crown, and comprises an open-loop strip spring having a first end, a second end, and a body therebetween, having a second projection extending axially from the first end toward the carrier and configured to cooperate in contact with the first projection of the carrier, having a pair of third projections extending axially from the body and spaced an angular distance apart from one another and apart from the second projection, and being configured to slide with respect to said internal surface of said crown when the torque transmitted between said crown and said hub reaches a predetermined level (T1, T2);

wherein the pair of third projections are positioned to cooperate in contact circumferentially with the pair of projections of the hub;

wherein said crown comprises a machined area in said internal surface comprising a grooved or wavy surface having dimensions to enable a predetermined friction between said strip spring and said crown.

2. The pulley according to claim 1, wherein said strip spring is radially sized to be spaced by a predetermined distance (H) with respect to said torsion spring, said distance (H) being proportional to a maximum torque that can be transmitted by said torsion spring.

3. The pulley according to claim 1, in which a free angle between said crown and said hub is defined between said pair of axial projections or said strip spring and said respective axial projections of said hub.

4. The pulley according to claim 1, wherein said strip spring defines a secondary axial projection extending on an opposite side to said pair of projections, said secondary axial projection being configured to cooperate in contact circumferentially with said first projection of said carrier.

5. The pulley according to claim 1, wherein said torque limiting joint comprises an actuator element housed in a space circumferentially delimited between two ends of said strip spring, said actuator element being dimensioned axially to cooperate in contact, on one side, with said first projection of said carrier and, on the other, one of said respective axial projections of said hub.

6. The pulley according to claim 5, wherein said actuator element is a metal lever able to expand said spring under a thrust of said first projection of said carrier.

7. The pulley according to claim 6, wherein said lever is configured to interact with said ends of said strip spring under torque from said carrier.

8. The pulley according to claim 1, wherein said portion integral with said hub comprises an annular head on which a bearing is mounted to support said crown.

9. The pulley according to claim 1, wherein said respective axial projections of said hub are made on a flanged portion integral with said hub, said flanged portion being sized to wrap, in part, externally said torsion spring.

10. The pulley according to claim 9, wherein said pulley comprises a sliding bearing operatively interposed between said flanged portion and said crown.

11. The pulley according to claim 1, wherein said carrier defines a radial projection defining a spring holder for one of the ends of said spring.

12. The pulley according to claim 1, wherein said pulley comprises a damping ring operatively interposed between said carrier and a head element attached to said hub, said damping ring being configured to allow the sliding of said carrier with respect to said head element.

13. The pulley according to claim 12, wherein said damping ring comprises a first portion radially interposed between said crown and said carrier and a second portion interposed between said carrier and said head element.

* * * * *